Dec. 15, 1959 O. KORNEI 2,917,589

HIGH EFFICIENCY MAGNETIC RECORDING AND REPRODUCING HEAD

Filed Jan. 7, 1955

*INVENTOR.*
OTTO KORNEI
*BY*
William J. Flynn
ATTORNEY

United States Patent Office 2,917,589
Patented Dec. 15, 1959

2,917,589

HIGH EFFICIENCY MAGNETIC RECORDING AND REPRODUCING HEAD

Otto Kornei, Cleveland Heights, Ohio, assignor to Clevite Corporation, Cleveland, Ohio, a corporation of Ohio Application January 7, 1955, Serial No. 480,467

2 Claims. (Cl. 179—100.2)

This invention relates to a magnetic transducer head for magnetic recording and reproducing.

In certain applications of magnetic sound recording it is extremely desirable to record as much signal information as possible on a given space on the record medium without unduly deteriorating the quality of the signal in recording and reproduction. It is well recognized that this result may be accomplished by slowing down the speed of the record medium during recording and playback and by making the recorded signal track width as narrow as possible. However, in practice, the adoption of these expedients is limited by the efficiency of the magnetic transducer head used in recording and reproducing the signal. Although the physical structure of the transducer head determines the recorded signal track width, it is the efficiency of the head which imposes a lower limit on the signal track width and the record speed for a given signal fidelity.

The present invention is concerned with a novel magnetic transducer head which extends the practical utility of magnetic sound recording and reproducing to applications where the signal track width is considerably narrower, and the record speed during recording and reproducing is substantially lower, than is conventional in present day magnetic recording equipment.

Accordingly, it is an object of the present invention to provide a novel magnetic recording and reproducing head which is particularly adapted for operation with extremely narrow recorded signal track widths, as well as at reduced record speeds during recording and reproducing.

It is also an object of this invention to provide a novel magnetic recording and reproducing head of improved efficiency.

Another object of this invention is to provide a novel magnetic recording and reproducing head having reduced eddy current losses.

A further object of this invention is to provide a novel magnetic recording and reproducing head having an improved frequency response.

A further object of this invention is to provide a novel magnetic recording head which requires less recording power.

A still further object of this invention is to provide a novel magnetic reproducing head having a higher playback level.

Also, it is an object of the present invention to provide a novel and cost saving method of fabricating a magnetic transducer head.

Other and further objects and advantages of the present invention will be apparent from the following description of a preferred embodiment thereof, which is illustrated in the accompanying drawing and described in detail in the following description.

Figures 1, 2, 3, 4, 5, 6, 7:
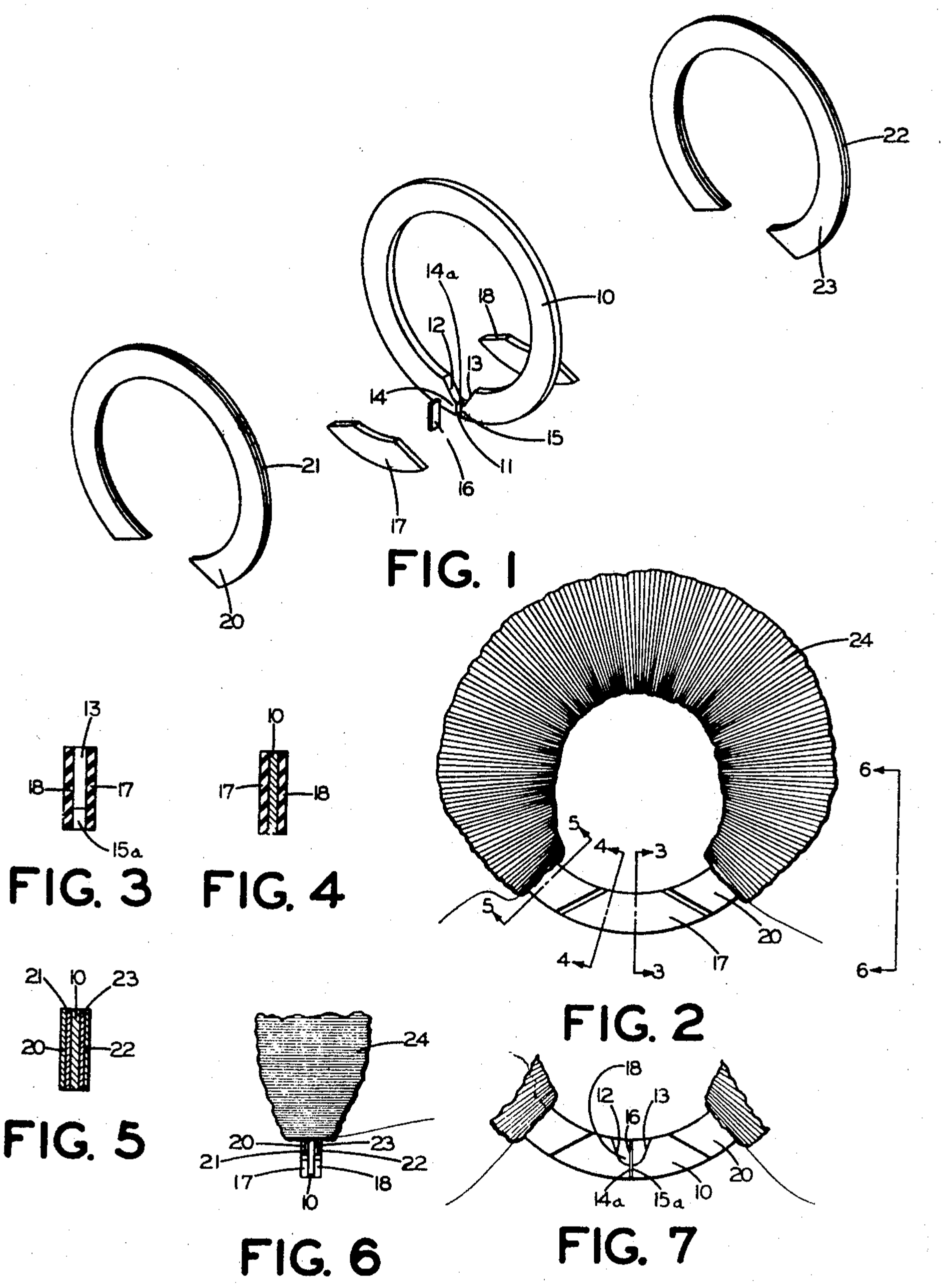
Figure 1 is an exploded perspective view on an enlarged scale showing the magnetic core structure, the shim and the pole shoes in the present magnetic transducer head.
Figure 2 is an enlarged plan view of the present head.
Figure 3 is a section, on a scale enlarged over that of Fig. 2, through the recording/reproducing gap of the head, taken along the line 3—3 in Fig. 2, with the shim removed.
Figure 4 is a section, on the same scale as Fig. 3, through the core of the head adjacent one of the pole tips, taken along the line 4—4 in Fig. 2.
Figure 5 is a section, on the same scale as Fig. 3, through the core further away from the recording/reproducing gap, taken along the line 5—5 in Fig. 2.
Figure 6 is a fragmentary end view of the present head viewed along the line 6—6 in Fig. 2 and on the same scale as Fig. 2.
Figure 7 is a fragmentary view of the head shown in Fig. 2 with the front pole shoe 17 removed.

Referring to the drawing, in accordance with the present invention the magnetic core structure of the present transducer head includes a middle ring-shaped lamination 10 of high permeability material. The middle lamination is a thin, flat annulus of substantially circular outline. In one practical embodiment the ring-shaped lamination 10 is .014 inch thick and has an outer diameter of .650 inch and an inner diameter of .467 inch. A very narrow radial slit 11 is cut through the lamination 10, for instance by the use of a saw. At this slit 11, at the inner side of the circular lamination 10 portions are cut away at 12 and 13 so that the pole tips 14 and 15, which are located at the opposite sides of the slit 11, are of substantially smaller cross-section then the main body of the middle lamination 10. A thin, flat shim 16 of non-magnetic material is inserted into the slit 11. Usually the slit 11 cut by the saw will be several times wider than the desired width of the recording/reproducing gap of the head. In practice, the saw-cut slit can be made as small as .005 inch across, while the shim 16 may have a thickness of only .00025 inch. The shim thickness is equal to the desired gap length and the middle lamination 10 must be pinched to force its pole tips 14 and 15 tightly against the opposite faces of the shim 16 in order to establish this gap length.

In order to secure the parts in this position and to physically reinforce the head adjacent the recording/reproducing gap, there are provided pole shoes 17 and 18 of non-magnetic, dielectric material, such as paper base laminated plastic or any other kind of laminated, filled or unfilled plastic. Each of these pole shoes is arcuate in outline, corresponding to the outline of the middle lamination 10 of the core of the head. The pole shoes are cemented or otherwise securely bonded to the opposite flat faces of the flat annular middle lamination 10 at opposite sides of the slit 11 and extend across the ends of the non-magnetic shim 16. The pole shoes 17 and 18 are cemented to the ring-shaped core lamination 10 while the latter is pinched against the shim 16, so that when the cement hardens the pole shoes serve to maintain the lamination 10 compressed, with the shim 16 clamped tightly between the pole tips 14 and 15.

In accordance with the present invention, the core structure of the magnetic head also includes a pair of arcuate side laminations 20 and 21 cemented to one face of the middle lamination, and a second pair of side laminations 22 and 23 cemented to the opposite face of the middle lamination. In one practical embodiment each side lamination is .006 inch thick. These side laminations are of high permeability material and coextensive with the middle lamination 10 throughout the latter's extent except in the immediate vicinity of the slit 11. As is evident from Fig. 2, these side laminations terminate at either end closely adjacent to the opposite ends of the non-magnetic, non-conductive pole shoes 17 and 18.

The head assembly is completed by a coil 24 of electrically conductive wire wound around the core laminations and extending almost the full extent of the side laminations 20—23, as best shown in Fig. 2.

In accordance with the present invention the magnetic transducer head is assembled in the following manner: The flat ring 10 having portions cut away at 12, 13 is punched from high permeability material. Several such rings are then clamped in place on a mandrel with their respective cut away portions 12, 13 precisely aligned and a saw cuts the narrow radial slit 11 about .005 inch across in each ring. Each ring 10 is carefully annealed either before or after the radial slit 11 is cut.

The shim 16, which may be about .00025 inch thick, is inserted into the slit 11 and the ring 10 is then slightly stressed in compression to pinch the shim between the aligned pole tips 14 and 15. If the shim is wider than the pole tips the protruding ends of the shim may be bent to lie flat against the major faces of the ring 10. With the parts in this position the non-magnetic, non-conductive pole shoes 17 and 18 are cemented to opposite faces of the ring 10, and after the cement hardens these pole shoes serve to maintain the ring 10 pinched against the shim, so that the shim precisely defines the gap length of the head. In addition, these pole shoes maintain the opposed confronting pole tips 14 and 15 in precise alignment.

Following this, the arcuate side laminations 20—23 are cemented to the opposite faces of the ring 10. These side laminations are provided in the core structure to reduce the magnetic reluctance of the core below the value it would have if it consisted solely of the middle lamination 10. The efficiency of the core structure is thereby considerably enhanced. This is of particular importance where the middle lamination 10 is stressed, as described above. Such stress degrades the magnetic properties of the middle lamination 10 to some extent. However, the side laminations 20—23 of the core are unstressed during and after their attachment to the ring 10. This is of particular advantage since it avoids degradation of the magnetic properties of these side laminations which would be caused by mechanical stress. Thus, while the magnetic properties of the middle lamination 10 are somewhat degraded, due to the mechanical stress imposed by maintaining it pinched against the shim 16, the unstressed side laminations conduct most of the magnetic flux through the laminated core structure.

After the toroidal coil 24 is wound around the core structure, the assembly may be completed by embedding the entire head in suitable plastic potting material, not shown, which provides a physical support for the head.

It is to be noted that in the novel head structure of the present invention the active recording and reproducing part of the head (immediately adjacent the recording/reproducing gap at which the shim 16 is positioned) has the thickness of a single lamination only, which provides an extremely narrow track width for the recorded signals. In practice, the recorded track width may be within the range from about .006 inch to about .020 inch, corresponding to the thickness of the middle lamination 10 of the head core.

The non-conductivity of the pole shoes 17 and 18, which bridge the recording/reproducing gap, minimizes eddy current losses in the vicinity of the recording/reproducing gap. This factor is of paramount importance, eddy current losses in this region, especially, being extremely deleterious because this is the region of highest signal flux density in the core structure of the head. In addition, losses of any kind tend to be more pronounced in a magnetic structure of inherently higher effective permeability, such as the annular core in the present head. It has been found that the improved efficiency of the present head to a very great extent is due to the provision of the non-conductive pole shoes.

The magnetic transducer head constructed as described hereinbefore has been found to have a considerably improved response in the high frequency range because of the reduced eddy current losses and the generally improved efficiency of the magnetic circuit. When used in recording the present head requires less recording power, for the same reasons, while in playback the head produces a higher output signal level.

While there has been described herein and illustrated in the accompanying drawing a specific preferred embodiment of the present invention, it is to be understood that various modifications, omissions and refinements departing from the disclosed embodiment may be adopted without departing from the spirit and scope of this invention. For example, in place of the separate rigid pole shoes 17 and 18 described above, there may be applied suitable, preferably plastic and non-conductive material in liquid form to the opposite faces of the middle core lamination 10 at each side of the slit 11 and bridging the shim. After hardening this material rigidly maintains the middle core lamination pinched against the shim with the confronting pole faces **14*a* and 15*a* of the pole tips aligned, as well as providing physical support for the pole tips. In either case the pole shoe material should be ground flush with the outer periphery of the middle lamination 10 adjacent the gap. Preferably, the pole shoe material should wear at about the same rate as the material of the middle lamination 10. Furthermore, in place of the pairs of arcuate side laminations, one at either side of the middle lamination 10, one might use single side laminations secured to each side of the middle lamination, respectively. Also, the slit in the middle core lamination 10** may be made by shearing, rather than sawing, in which case this slit would be of the same order of size as the non-magnetic shim which is inserted into the slit, so that little or no stress in the middle core lamination would be required to hold the shim in place.

I claim:

1. A magnetic transducer head comprising a thin annular middle core lamination of high permeability magnetic material having a narrow radial slit, said middle core lamination presenting aligned confronting pole tips of reduced cross-section at opposite sides of said slit, a thin non-magnetic shim in said slit engaged between said pole tips, non-magnetic dielectric material bridging said slit and secured directly to said middle core lamination at each side of said slit and maintaining said pole tips aligned and in engagement with the shim, thin arcuate side core laminations of high permeability magnetic material secured directly to opposite faces of the middle core lamination and coextensive therewith from a point adjacent one end of said dielectric material around said core to a point adjacent the other end of said dielectric material, and a toroidal coil wound around the core laminations throughout the major portion of said arcuate laminations.

2. A magnetic transducer head comprising a thin ring of high permeability magnetic material having a radial slit and presenting confronting aligned pole faces at opposite sides of said slit, a thin non-magnetic shim positioned in said slit between the pole faces and having a thickness different from the distance between said pole faces in the unstressed condition of the ring, non-magnetic dielectric material bridging said slit and secured directly to said ring on each side of the slit and maintaining said pole faces aligned and in engagement with said shim, substantially unstressed arcuate side laminations of high permeability magnetic material secured directly to said ring and substantially coextensive therewith from a point adjacent one end of said dielectric material around said core to a point adjacent the other end of said dielectric material, and a toroidal coil wound around the assembly of the ring and side laminations.

(References on following page)

References Cited in the file of this patent

UNITED STATES PATENTS

| | | |
|---|---|---|
| 2,456,767 | Camras | Dec. 21, 1948 |
| 2,523,576 | Kornei | Sept. 26, 1950 |
| 2,612,681 | Camras | Oct. 7, 1952 |
| 2,668,878 | Munroe | Feb. 9, 1954 |
| 2,675,429 | Rohling | Apr. 13, 1954 |
| 2,736,776 | Camras | Feb. 28, 1956 |
| 2,761,911 | Camras | Sept. 4, 1956 |
| 2,769,036 | Selsted | Oct. 30, 1956 |
| 2,822,428 | Wood | Feb. 4, 1958 |

FOREIGN PATENTS

| | | |
|---|---|---|
| 429,987 | Great Britain | June 11, 1935 |